(No Model.)
P. R. PULLIAM.
PITMAN.
No. 402,105.　　　　　Patented Apr. 23, 1889.
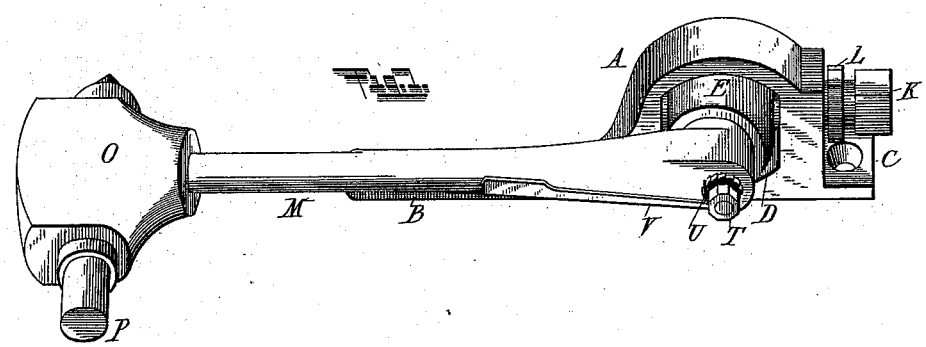
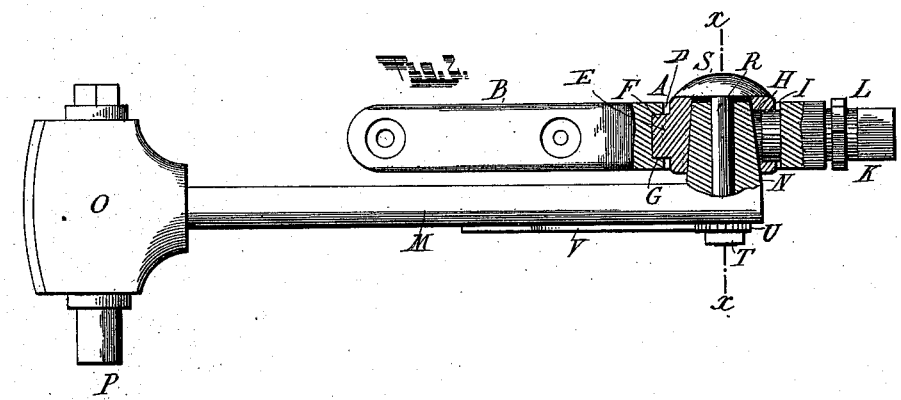
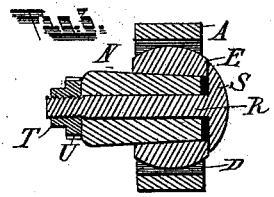
Witnesses:　　　　　　　　　　Inventor,
　　　　　　　　　　　　　　P. R. Pulliam
　　　　　　　　　　By his Attorney

UNITED STATES PATENT OFFICE.

PHILLIP R. PULLIAM, OF OMAHA, NEBRASKA, ASSIGNOR TO ELMER S. DUNDY, JR., OF SAME PLACE.

PITMAN.

SPECIFICATION forming part of Letters Patent No. 402,105, dated April 23, 1889.

Application filed September 24, 1888. Serial No. 286,195. (No model.)

*To all whom it may concern:*

Be it known that I, PHILLIP R. PULLIAM, a resident of Omaha, in the county of Douglas and State of Nebraska, have invented certain new and useful Improvements in Pitmen; and I do hereby declare the following to be a full, clear, and exact description of the invention, such as will enable others skilled in the art to which it pertains to make and use the same.

My invention relates to an improvement in pitmen for harvesters and other machinery; and it consists in the novel construction hereinafter described.

In the accompanying drawings, Figure 1 is a perspective view of a pitman embodying my improvements. Fig. 2 is a top plan view of the same, partly in section. Fig. 3 is a vertical transverse sectional view taken on line *x x* of Fig. 2.

A represents a bracket, which is provided at one end with an outward-extending arm, B, having countersunk holes, through which screws may be inserted to secure the plate or box on the cutter-bar of the harvester or on any other part of a machine to which it may be desired to impart reciprocating motion. At the opposite end of the bracket is an ear, C, having a similar countersunk opening for the same purpose. The vertical portion of the bracket is provided with a transverse opening, D, which has its ends flattened.

E represents a spherical block, which is provided at one side with a trunnion, F, which has its bearing in a recess, G, which communicates with one side of the opening D. In the opposite side of said spherical block is a recess or opening, H, which is in line with the trunnion and registers with an opening, I, in the bracket.

K represents a bolt, which is screwed into the opening I, and has its inner plane end bearing in the opening H. Thereby the spherical block is pivoted in the opening D and is adapted to turn axially therein. The bolt K is provided with a clamping-nut, L, which bears against one shoulder or side of the bracket and prevents the bolt from working loose in the opening I.

M represents the pitman, which is provided at one end with a laterally-extending tapered bearing, N, which is journaled in a similarly-tapered opening that is made transversely in the spherical block E. The opposite end of the pitman is provided with the head O, in which is a transverse opening for the reception of the wrist or crank pin P.

R represents a bolt, which extends through the bearing N and the inner end of the pitman, and it has an enlarged head, S, at its outer end, which bears against the outer side of the spherical block and has its inner end threaded and projecting beyond the inner side of the pitman. A nut, T, is screwed to said projecting end of the bolt and is provided with ratchet-teeth U. The same are engaged by a spring-dog, V, which is secured to the pitman, and thereby retrograde rotation of the nut is prevented, and hence the bolt R is prevented from working loose when the machine is in operation. By tightening the nut T on the bolt the tapered bearing may be moved farther into the tapered opening in the spherical block in order to compensate for wear, as will be readily understood.

From the foregoing description it will be obvious that the pitman is connected to the bracket flexibly, so that the latter may be axially turned in a direction at right angles to the axis of the pitman-bearing, thus especially adapting the pitman for use to connect the crank-wheel of a harvester to the cutter-bar thereof.

Having thus described my invention, I claim—

1. The combination of the bracket having the transverse opening and the openings G H, communicating with opposite sides thereof, the spherical block having the trunnion on one side engaging the opening G and provided on the opposite side with the opening I, registering with opening H, said block being further provided with the transverse tapering opening, the bolt K, screwed in opening H and having its inner end engaging opening I, for the purpose set forth, and the pitman having the tapered bearing at one end journaled in the tapered opening of the block, substantially as described.

2. The combination of the bracket, the block pivoted therein, the axis of said block being longitudinal in said bracket, the pitman having the tapered bearing at one end fitted in a transverse tapered opening in the block, and the clamping-bolt extending through said bearing having the head bearing against one side of the block and the clamping-nut bearing against the opposite side of the pitman, for the purpose set forth, substantially as described.

In testimony whereof I have signed this specification in the presence of two subscribing witnesses.

PHILLIP R. PULLIAM.

Witnesses:
T. K. SUTTON,
E. J. MURPHY.